United States Patent
Mattsson

(10) Patent No.: US 8,225,106 B2
(45) Date of Patent: Jul. 17, 2012

(54) DIFFERENTIAL ENCRYPTION UTILIZING TRUST MODES

(75) Inventor: Ulf Mattsson, Cos Cob, CT (US)

(73) Assignee: Protegrity Corporation, Grand Cayman (KY)

( * ) Notice: Subject to any disclaimer, the term of this patent is extended or adjusted under 35 U.S.C. 154(b) by 833 days.

(21) Appl. No.: 12/080,390

(22) Filed: Apr. 2, 2008

(65) Prior Publication Data

US 2010/0325443 A1    Dec. 23, 2010

(51) Int. Cl.
*G06F 11/30* (2006.01)

(52) U.S. Cl. ........ 713/189; 713/150; 713/155; 713/182; 726/2; 726/16; 726/17; 726/18; 726/19; 726/20; 726/21; 380/44; 380/277; 380/278; 380/279; 705/50; 705/64; 705/67; 705/71; 705/72; 705/73; 705/76

(58) Field of Classification Search .................. 713/150, 713/155, 182, 189; 726/2, 16–21, 27, 30; 380/44, 277–279; 705/50, 64, 67, 71–73, 705/76
See application file for complete search history.

(56) References Cited

U.S. PATENT DOCUMENTS

| | | | |
|---|---|---|---|
| 4,438,824 A * | 3/1984 | Mueller-Schloer | 713/185 |
| 4,956,769 A | 9/1990 | Smith | |
| 5,265,221 A | 11/1993 | Miller | |
| 5,271,007 A | 12/1993 | Kurahashi et al. | |
| 5,283,830 A | 2/1994 | Hinsley et al. | |
| 5,375,169 A | 12/1994 | Seheidt et al. | |
| 5,438,508 A | 8/1995 | Wyman et al. | |
| 5,446,903 A | 8/1995 | Abraham et al. | |
| 5,493,668 A | 2/1996 | Elko et al. | |
| 5,504,814 A | 4/1996 | Miyahara | |
| 5,606,610 A | 2/1997 | Johannsson | |
| 5,850,443 A * | 12/1998 | Van Oorschot et al. | 380/285 |
| 6,321,201 B1 | 11/2001 | Dahl | |
| 6,751,949 B2 | 6/2004 | Tamura et al. | |
| 6,963,980 B1 * | 11/2005 | Mattsson | 713/194 |
| 7,051,077 B2 | 5/2006 | Lin | |
| 7,120,933 B2 | 10/2006 | Mattsson | |
| 7,305,707 B2 | 12/2007 | Mattsson | |
| 7,325,129 B1 | 1/2008 | Mattsson et al. | |
| 7,412,603 B2 * | 8/2008 | Yeates et al. | 713/182 |
| 7,418,098 B1 | 8/2008 | Mattsson et al. | |
| 7,437,567 B2 * | 10/2008 | Hollingshead | 713/186 |

(Continued)

FOREIGN PATENT DOCUMENTS

EP    1207443 A2    5/2002

(Continued)

OTHER PUBLICATIONS

Patricia Dwyer et al., "Query Processing in LDV: A Secure Database System", 4th Aerospace Computer Security Applications Conf. 118-124 (1988).

(Continued)

*Primary Examiner* — Nabil El Hady
(74) *Attorney, Agent, or Firm* — Fenwick & West LLP

(57) ABSTRACT

Systems and methods are provided for data protection across connected, disconnected, attended, and unattended environments. Embodiments of the inventions may include differential encryption based on network connectivity, attended/unattended status, or a combination thereof. Additional embodiments of the invention incorporate "trust windows" that provide granular and flexible data access as function of the parameters under which sensitive data is accessed. Further embodiments refine the trust windows concept by incorporating dynamic intrusion detection techniques.

24 Claims, 10 Drawing Sheets

U.S. PATENT DOCUMENTS

| | | | |
|---|---|---|---|
| 7,739,402 B2* | 6/2010 | Roese et al. | 709/242 |
| 2002/0114465 A1* | 8/2002 | Shen-Orr et al. | 380/231 |
| 2002/0143708 A1* | 10/2002 | Hollander et al. | 705/72 |
| 2003/0135752 A1* | 7/2003 | Sokolic et al. | 713/200 |
| 2003/0187619 A1* | 10/2003 | Lee et al. | 702/188 |
| 2005/0257052 A1* | 11/2005 | Asai et al. | 713/166 |
| 2006/0121883 A1* | 6/2006 | Faccin | 455/411 |
| 2007/0083928 A1 | 4/2007 | Mattsson et al. | |
| 2008/0082834 A1 | 4/2008 | Mattsson | |
| 2008/0123850 A1* | 5/2008 | Bhatnagar et al. | 380/259 |

FOREIGN PATENT DOCUMENTS

| | | |
|---|---|---|
| EP | 1207462 A2 | 5/2002 |
| EP | 1209550 A2 | 5/2002 |
| GB | 2248951 A | 4/1992 |
| RU | 2022343 C1 | 10/1994 |
| WO | WO-95/22792 | 8/1995 |

OTHER PUBLICATIONS

Cristi Garvey & Amy Wu, "ASD_Views", Proc. 1988 IEEE Symposium on Research in Security & Privacy 85-95 (1988).

Richard D. Graubart & Kevin J. Duffy, "Design Overview for Retrofitting Integrity-Lock Architecture onto a Commercial DBMS", Proc 1985 Symposium on Security & Privacy 147-159 (1985).

Patricia A. Rougeau & Edward D. Sturms, "The Sybase Secure Dataserver: A Solution to the Multilevel Secure DBMS Problem", Proc 10th Nat'l Comp. Sec. Conf. 211-215 (1987).

Billy G. Claybrook, "Using Views in a Multilevel Secure Database Management System", Proc. 1983 Symp. on Sec. and Privacy 4-17 (1983).

Dorothy E. Denning et al., "Views for Multilevel Database Security", IEEE Transactions on Software Eng. 129-140 (1987).

Catherine Meadows, "Extending the Brewer-Nash Modelto a Multilevel Context", 1990 IEEE Computer Society Symp. on Research in Sec. & Privacy 95-102 (1990).

Dorothy E. Denning, "Commutative Filters for Reducing Inference Threats in Multilevel Database Systems", Proc. 1985 Symp. on Sec. & Privacy 134-146 (1985).

Elisa Bertino, "Data Hiding & Security in Object-Oriented Databases", 8th Int'l Conf. on Data Engineering 338-347 (1992).

Masaaki Mizuno & Mitchell L Neilsen, "A Secure Quorum Protocol", 14th Nat'l Comp. Sec. Conf. 514-523 (1991).

E. John Sebes & Richard J. Feiertag, "Trusted Distributed Computing: Using Untrusted Network Software", 14th Nat'l Comp. Sec. Conf. 608-618 (1991).

Vijay Varadharajan, "A Security Reference Model for a Distributed Object System & its Application", 15th Nat'l Comp. Sec. Conf. 593-619 (1992).

George I. Davida, "Cryptographic Relational Algebra", Proc. 1982 Symp. on Sec. & Privacy 111-116 (1982).

D.E. Denning, "Cryptographic Checksums for Multilevel Database Security", Proc. 1984 Symp. on Sec. & Privacy, IEEE Computer Society Press, 52-61 (1984).

Selim G. Akl & Peter D. Taylor, "Cryptographic Solution to a Problem of Access Control in a Hierarchy", 1(3) ACM Trans. on Comp. Sys. 239-248 (Aug. 1983).

George I. Davida, David L. Wells, & John B. Kam, "A Database Encryption System with Subkeys", 6(2) ACM Trans. on Database Sys. 312-328 (Jun. 1981).

Jeffrey N. Thompson, Unit Fileutil.Tpu V.1.0 (Dec. 1990), available at HTTP://www.bsdg.org/SWAG/FILES/0062.PAS.

Darrell Woelk and Won Kim, "Multimedia Information Management in an Object-Oriented Database System", Proc. 13th VLDB Conference 319-328 (1987).

IBM, "DB2 for OS/390 V5 Administration Guide" δ B.2, B.3.2, B.3.3, B.3.4, B.7, & B.7.4 (Apr. 20, 2000).

P.C. Yeh & R.M. Smith, Sr., "ESA/390 Integrated Cryptographic Facility: An Overview", 30(2) IBM Systems J. 192-205 (1991).

IBM, "IBM Database 2 Version 2: Application Programming & SQL Guide", 30, 31, 33, 48, 82, 102, 106, 286, & 529 (3d. ed. Mar. 1992).

Stephen L. Montgomery, "Relational Database Design & Implementation Using DB2" 10-11 (1990).

Bruce L. Larson, "The Database Experts' Guide to Database 2" 23 and 372 (1988).

Charles F. Pfleeger, "Security in Computing" 364-365 (2d. ed. 1997).

Deborah Downs & Gerald J. Popek, "A Kernel Design for a Secure Data Base Management System", Proc. Very Large Data Bases 507-514 (Oct. 1977).

D.G. Abraham et al., "Transaction Security System", 30(2) IBM Systems J. 206-229 (1991).

D.B. Johnson et al., "Common Cryptographic Architecture Cryptographic Application Programming Interface", 30(2) IBM Systems J. 130-150 (1991).

Matthew Morgenstern, "Controlling Logical Inference in Multilevel Database Systems", Proc. 1988 IEEE Symp. on Sec. & Privacy 245-255 (Apr. 1988).

Dorothy E. Denning, "Field Encryption & Authentication", Advances in Cryptology: Proc. Crypto 83 231-247 (1984).

Shirley Eichenwald, "Information Technologies: Physician-Hospital Networks", 63(3) J. AHIMA 50-51 (Mar. 1992).

C.C. Chang, "An Information Protection Scheme Based Upon Number Theory", 30(3) Computer J. 249-253 (1987).

Charles F. Pfleeger, "Security in Computing" iii-xiii & 336-376 (1997).

Application Security, Inc., "DbEncrypt™ for Oracle User Guide" (2001).

PCI Security Standards Council, "Payment Card Industry (PCI) Data Security Standard" (Sep. 2006).

David K. Gifford, "Cryptographic Sealing for Information Secrecy & Authentication", 25(4) Comm. of ACM 274-286 (Apr. 1982).

R.W. Conway et al., "On the Implementation of Security Measures in Information Systems", 15(4) Communications of the ACM 211-220 (Apr. 1972).

Lein Harn & Hung-Yu Lin, "A Cryptographic Key Generation Scheme ofr Multilevel Data Securtiy", 9(6) Computers & Security 539-546 (1990).

W. Richard Stevens, "UNIX Network Programming" 581-587 (2d ed. 1998).

Andrew S. Tanenbaum, "Computer Networks" 737-750, 752-755 (4th ed. 2003).

Bruce Schneier, "Applied Cryptography" 194-205 (2d ed. 1996).

Federal Information Processing Standards (FIPS) Publication 197.

C. Adams et al., Internet X.509 Public Key Infrastructure Time-Stamp Protocol (TSP) (2001).

E.B. Fernandez et al., "Database Security & Integrity" xi-xiv, 55-106, 183-216, 309-320 (1981).

David K. Hsiao et al., "Database Access Control in the Presence of Context Dependent Protection Requirements", SE-5(4) IEEE Trans. Software Eng. 349-358 (Jul. 1979).

Gary W. Smith, "Multilevel Secure Database Design: A Practical Application Proc.", 5th Ann. Computer Security Conf. 314-321 (1989).

Li Gong, "A Secure Identity-Based Capability System", Proc. 1989 IEEE Symp. Sec. & Privacy 56-63 (May 1989).

Sushi Jajodia & Boris Kagan, "Integrating an Object-Oriented Data Model with Multilevel Security", Proc. 1990 IEEE Computer Society Symp. Research in Security and Privacy 76-85 (1990).

Rafael Ahad et al., "Supporting Access Control in an Object-Oriented Database Language", Advances in Database Technology—EDBT '92: Proc. 3d Int'l Conf. Extending Database Technology 184-200 (1992).

Gerald C. Chick & Stafford E. Tavares, "Flexible Access Control with Master Keys", 435 Lecture Notes in Comp. Sci. 316-322 (1990).

Ravinderpal S. Sandhu, "Cryptographic Implementation of a Tree Hierarchy for Access Control", 27 Information Processing Letters 95-98 (1988).

Udo Kelter, "Discretionary Access Controls", Proc. 1991 IEEE Symp. on Research in Security & Privacy 288-299 (1991).

* cited by examiner

DIFFERENTIAL ENCRYPTION UTILIZING TRUST MODES

TECHNICAL FIELD

The present invention generally relates to systems and methods of data protection across connected, disconnected, attended, and unattended environments.

BACKGROUND

As credit and debit cards become ubiquitous in commerce, security concerns that were once limited to centralized databases are expanding to encompass the entire stream of commerce, beginning at the point of sale. Moreover, organizations must comply with a number of data security standards including the Payment Card Industry (PCI) Data Security Standard, Basel II, the Gramm-Leach-Bliley Act, the Health Insurance Portability and Accountability Act (HIPAA), and California State Bulletin 1836.

Consider the example of a supermarket with a number of point of sale terminals. Each terminal should be capable of accepting credit card payments which must be transferred to the card issuer for payment and/or stored in the supermarket's database. Each terminal may be used by several cashiers over the course of a day. Each terminal may be powered on or off due to planned or unplanned events and may lose network connectivity at any given moment. Moreover, each terminal may be used in an attended mode in which a user such as a cashier, manager, or technician is authenticated or in an unattended mode where an authenticated user is not present, such as in a self-checkout environment. Such a system presents a need for strong security need, while requiring that the system is resilient in the face of network and power interruptions.

SUMMARY OF THE INVENTION

Systems and methods are provided for data protection across connected, disconnected, attended, and unattended environments. Embodiments of the inventions may include differential encryption based on network connectivity, attended/unattended status, or a combination thereof.

A first aspect of the invention is directed to a method of data security including detecting the status of a connection between a system and a security system, and when detecting that the system is disconnected from a security device, implementing a first encryption paradigm for the system; and when detecting that the system is connected to the security device, implementing a second encryption paradigm for the system.

In some embodiments, the system can be a client, a server, a personal computer, a handheld device, a personal digital assistant, a cellular phone, a kiosk, an automatic teller machine, a point of sale system, and/or a vending machine.

The method can also include creating temporary credentials and/or replacing the temporary credentials with credentials allowing access to the security device. The method can further include creating a temporary encryption key and/or replacing the temporary encryption key with a durable encryption key. Other embodiments include encrypting the temporary encryption key and/or obtaining a temporary encryption key previously sent by the security device. Data can be encrypted with the temporary encryption key.

The method can also include storing the data on the system and/or transferring the data from the system to a storage device. In other embodiments, information about the temporary encryption key is transferred with the data. Information about the temporary credentials can also be transferred with the data.

In other embodiments, the step of implementing a second encryption paradigm includes receiving a durable encryption key from the security device. In still further embodiments, the step of implementing a second encryption paradigm includes receiving a new temporary encryption key from the security device.

In some embodiments, the first encryption paradigm includes a first limit on data access. In other embodiments, the second encryption paradigm includes a second limit on data access. In still further embodiments, the first encryption paradigm includes a first limit on data access, the second encryption paradigm includes a second limit on data access, wherein the second limit allows for more data access than the first limit.

Another aspect of the invention is directed to a method of data security including detecting whether a system is attended, and when detecting that the system is unattended, implementing a first encryption paradigm for the system, and when detecting that the system is attended, implementing a second encryption paradigm for the system.

In some embodiments, the step of implementing a first encryption paradigm includes creating temporary credentials and/or creating a temporary encryption key. The method may also include encrypting the temporary encryption key. In other embodiments, the method includes obtaining a temporary encryption key previously sent by the security device. The method can also include encrypting data with the temporary encryption key.

Further embodiments of the method include transferring the data from the system to a storage device. Information about the temporary encryption key and/or temporary credentials can be transferred with the data. In some embodiments, the step of implementing a second encryption paradigm includes receiving a new temporary encryption key from the security device. In other embodiments, the step of implementing a second encryption paradigm includes receiving a durable encryption key from the security device.

In some embodiments, the first encryption paradigm includes a first limit on data access. In other embodiments, the second encryption paradigm includes a second limit on data access. In still further embodiments, the first encryption paradigm includes a first limit on data access; the second encryption paradigm includes a second limit on data access, wherein the second limit allows for more data access than the first limit.

Another aspect of the invention is directed to a computer-readable medium whose contents cause a computer to perform a method of data security including detecting the status of a connection between a system and a security system, and when detecting that the system is disconnected from a security device, implementing a first encryption paradigm for the system, and when detecting that the system is connected to the security device, implementing a second encryption paradigm for the system.

Yet another aspect of the invention is directed to a computer-readable medium whose contents cause a computer to perform a method of data security comprising detecting whether a system is attended, and when detecting that the system is unattended, implementing a first encryption paradigm for the system, and when detecting that the system is attended, implementing a second encryption paradigm for the system.

FIGURES

Figures are provided to generally illustrate principles of the invention and/or to show certain embodiments according to the invention. The figures are not necessarily to scale. Each figure is briefly described below.

DESCRIPTION OF THE INVENTION

Systems and methods are provided for data protection across connected, disconnected, attended, and unattended environments. Embodiments of the inventions may include differential encryption based on network connectivity, attended/unattended status, or a combination thereof.

Illustrative Embodiment

The features of this invention are explained in the context of a retail environment as described below. This embodiment is but one of many and is not intended to be limiting in any way.

Figure 1:
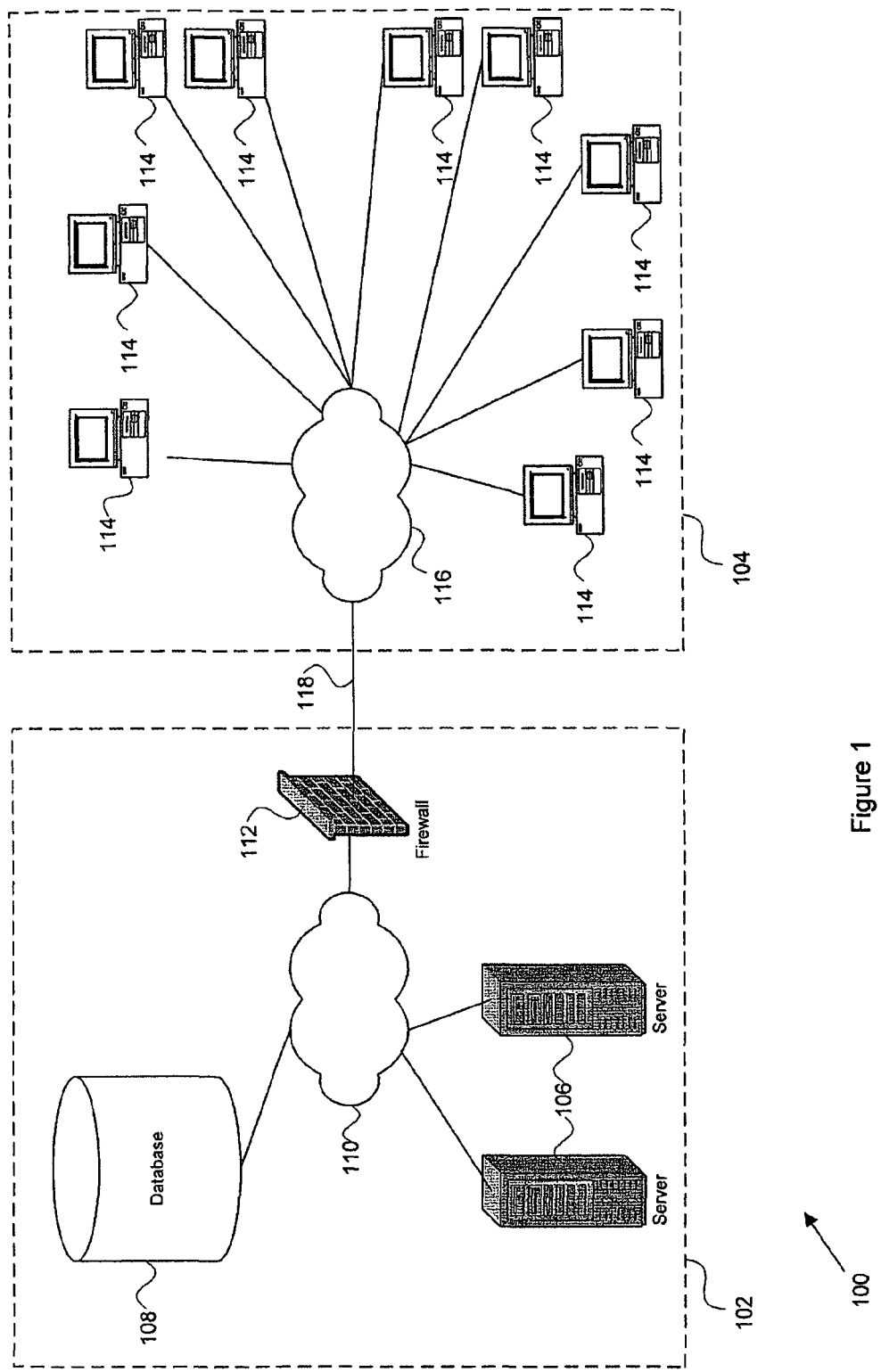
FIG. 1 illustrates an exemplary environment in which the embodiments of the invention may be implemented.

FIG. 1 depicts an environment 100 representing a high-level network architecture for a retail operation. Zone 102 defines a network residing in a data center, for example at corporate headquarters or another location. Zone 104 defines a network within a retail store. Although FIG. 1 depicts only one data center 102 and store 104, there can be multiple data centers 102 and multiple stores 104. Thus, the relationship between each entity may be, for example, one to one (1:1), one to many (1:*), many to one (*:1), or many to many (*:*).

Zone 102 contains a variety of equipment including servers 106 and databases 108 connected by networking equipment represented by cloud 110. Devices 106 and 108 preferably may be separated from outside network traffic by firewall 112.

Zone 104 also contains a variety of equipment, for example, point of sale (POS) systems 114, connected by networking equipment 116 which can include a local server and/or a database (not shown). Data link 118 connects zones 102 and 104.

The servers 102 and POS systems 114 typically include an operating system to manage devices such as disks, memory and I/O operations and to provide programs with a simpler interface to the hardware. Operating systems suitable for use with this environment include, for example: Unix®, available from the X/Open Company of Berkshire, United Kingdom; FreeBSD, available from the FreeBSD Foundation of Boulder, Colo.: Linux®, available from a variety of sources; GNU/Linux, available from a variety of sources; POSIX®, available from IEEE of Piscataway, N.J.; OS/2®, available from IBM Corporation of Armonk, N.Y.; Mac OS®, Mac OS X®, Mac OS X Server®, all available from Apple Computer, Inc. of Cupertino, Calif.; MS-DOS®, Windows®, Windows 3.1®, Windows 95®, Windows 2000®, Windows NT®, Windows XP®, Windows Server 2003®, Windows Vista®, all available from the Microsoft Corp. of Redmond, Wash.; and Solaris®, available from Sun Microsystems, Inc. of Santa Clara, Calif. See generally Andrew S. Tanenbaum, *Modern Operating Systems* (2d ed. 2001). Such operating systems are well-known to those skilled in the art and, thus, not further described herein.

Differential Encryption Based on Network Connectivity

In some embodiments, various encryption paradigms are implemented depending on whether a POS system is connected to or disconnected from a security device.

As used herein, a system includes any device based in hardware, software or firmware. For example, the POS system may include a client, a server, a personal computer, a handheld device, a personal digital assistant, a cellular phone, a kiosk, an automatic teller machine (ATM), a vending machine, or combinations of such devices. In some embodiments, the system is a specific point of sale (POS) device such as a cash register or vending machine. Point of sale systems are available from a variety of providers such as, for example, International Business Machines of Armonk, N.Y.; MICROS Systems of Columbia, Md.; NCR Corporation of Dayton, Ohio; Squirrel Systems of Vancouver, Canada; VeriFone of San Jose, Calif.; and Wincor Nixdorf of Paderborn, Germany. Additionally, point of sale systems can be assembled from widely available electronic equipment such as a personal computer through the implementation of POS device standards such as OPOS, JavaPOS, and UnifiedPOS.

The system preferably is capable of connection with a security device. As used herein, a security device includes any device based in hardware, software or firmware used to implement a security paradigm. Such devices include, but are not limited to, hardware security modules (HSMs), access control systems, and encryption key databases. A security device can be a specialized piece of hardware or can be implemented on a general purpose piece of equipment such as a server 106.

A HSM securely generates and/or stores keys for cryptography. A HSM may be embedded in the hardware of a system or can be a plug-in card implementing the Peripheral Component Interconnect (PCI) standard or external device connected, e.g., through a standard such as RS232, SCSI, IP, USB, or PCMCIA or the like. Suitable HSMs include, but are not limited to those described in U.S. Pat. No. 6,963,980 to Mattsson and Federal Information Processing Standards (FIPS) Publication 140-2, the contents of which are hereby incorporated by reference herein. HSMs suitable for use in the present invention are available from a variety of providers including, but not limited to, Futurex of Bulverde, Tex.; SafeNet, Inc. of Belcamp, Md.; International Business Machines of Armonk, N.Y.; nCipher Corporation, Ltd. of Cambridge, United Kingdom; Utimaco Safeware Inc. of Foxboro, Mass.; and Sun Microsystems of Santa Clara, Calif.

Access control systems can provide a variety of security features including promulgating intrusion detection profiles, encryption paradigms, and encryption keys. An access control system can be implemented in many ways including, but not limited to, embodiment in a server, a client, a database or as a freestanding network component (e.g., as a hardware device). In some embodiments, the access control system is part of a DEFIANCE® or Secure.Data™ server, both available from Protegrity Corp. of Stamford, Conn. The access control system continuously monitors user activity, and prevents a user from accessing data for which the user is not cleared. An example of a clearance process is described in detail in U.S. Pat. No. 6,321,201 to Dahl, which is hereby incorporated by reference. Exemplary access control systems are further described in U.S. Patent Publication No. 2007/0083928 of Mattsson et al., which is hereby incorporated by reference.

The system and security device can be connected by LAN, WAN, Internet, Intranet, Virtual Private Network, Ethernet, Wi-Fi, Bluetooth, infrared, and the like now known and later developed. See generally, Andrew S. Tanenbaum, *Computer Networks* (4th ed. 2003). Moreover, the system and security device can be connected by a plurality of one or more of the above technologies.

Figure 2:
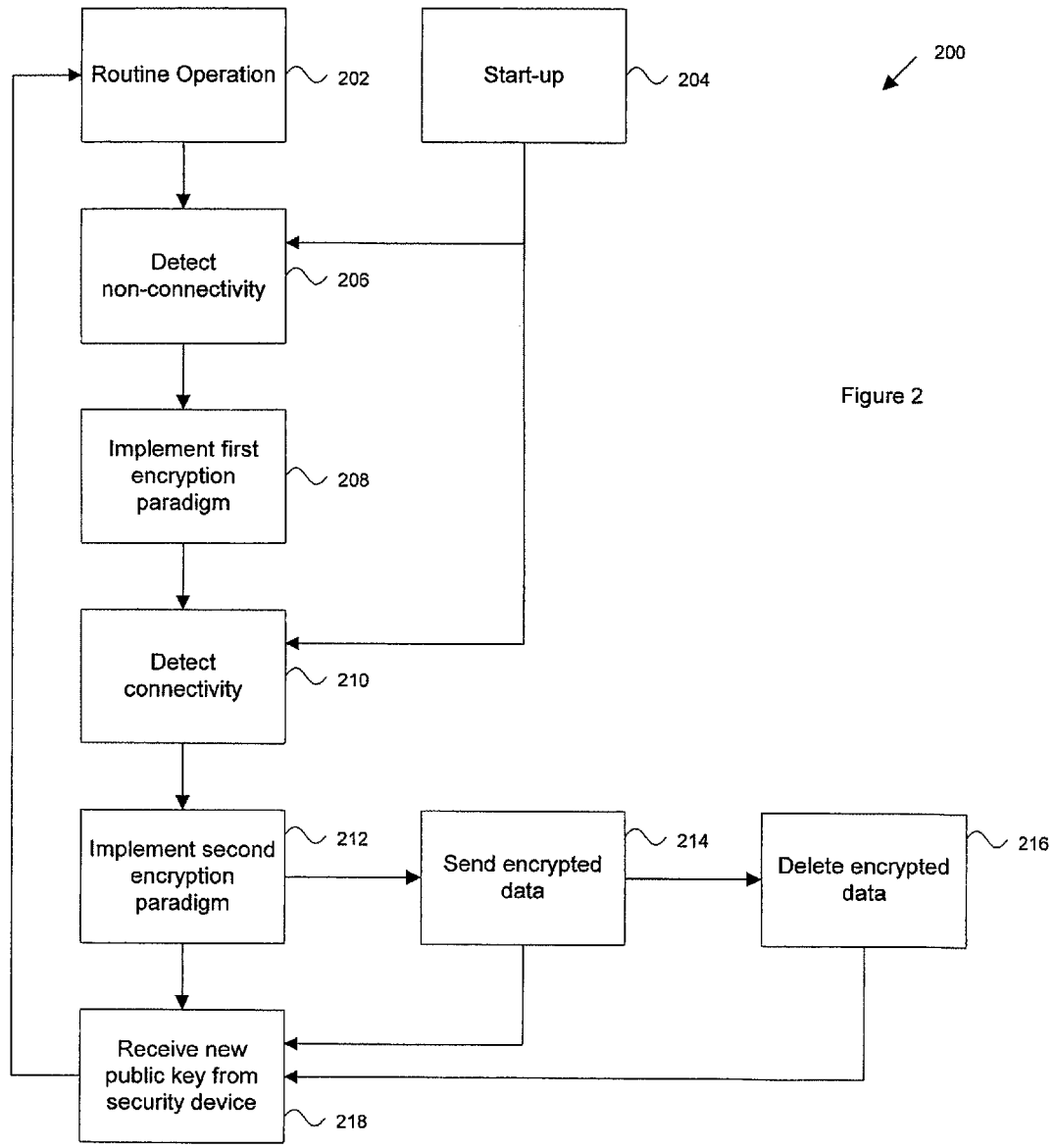
FIG. 2 is a flow chart depicting an embodiment of the invention for implementing a new encryption paradigm based on connectivity.

As depicted in FIG. 2, some embodiments of the invention are directed to a system for implementing and a method comprising the steps of: detecting that a system is disconnected from a security device (S206), implementing a first encryption paradigm for the system (S208), and/or detecting that the system is connected to the security device (S210), and implementing a second encryption paradigm for the system (S212).

Non-connectivity can occur and be detected at a variety of points. For example, non-connectivity can be detected at start-up of the system (S204). Alternatively, non-connectivity can occur during routine operation (S202) of the system and can be caused by a failure in one or more connection links or nodes or the failure of the security device. Upon detection of non-connectivity, a first encryption paradigm is implemented (S208).

Information on connectivity status can be provided, for example, by an operating system. For example, if the invention is implemented on a computer running the WINDOWS® operating system, services such as IsNetworkAlive, IsDestinationReachable, InternetGetConnectedState, and Internet CheckConnection can be used to ascertain and monitor the network status. If the invention is implemented on a computer running the LINUX® or UNIX® operating system, the netstat command can be used to ascertain and monitor the network status. Additionally or alternatively, a "heartbeat" function can be implemented to poll the security device. An exemplary heartbeat function is provided (with source code) in W. Richard Stevens, *UNIX Network Programming* 581-87 (2d ed. 1998), the contents of which are hereby incorporated by reference herein.

The first encryption paradigm can include one or more attributes. For example, the first encryption paradigm can specify an encryption algorithm such as Cramer-Shoup, RSA, FISH, SOBER, SOBER-128, Blowfish and Lucifer and the like. The encryption algorithm can also specify one or more encryption keys to be used for encryption of data. The encryption key(s) can be generated by the system, for example, by an HSM integrated into the system, or can have been generated by the security device and communicated by the security device to the system prior to the connectivity interruption. The key(s) can be stored in an HSM integrated with the system, in a certificate residing on the system, or in any type of memory contained within or coupled or connected to the system. The key(s) also can be encrypted.

The first encryption paradigm can also include the use or creation of temporary credentials. Such credentials, e.g. a username and password, allow for access to and/or use of the machine during the period of non-connectivity. Such credentials can be generated by the system, or may have been pre-generated and stored on the system. In such an embodiment, a plurality of username/password combinations can be stored on the system. During a period of non-connectivity, an appropriate password is determined (e.g. by consulting a codebook or calling a help desk or operations center). In some embodiments, the password is a one-time password and the username will not be used again, or at least not for a defined period of time. The temporary credentials can be updated by the system and/or the security device during periods of connectivity.

The credentials can be stored on the system and can be utilized along with the encryption key for encrypting data, for example as an initialization vector. Initialization vectors are described in, for example, Bruce Schneier, *Applied Cryptography* 194-205 (2d ed. 1996), the contents of which are hereby incorporated by reference herein. Additionally, information about the temporary encryption key and/or temporary credentials can be transferred with the encrypted data. Suitable methods for transferring encryption information with encrypted data include, but are not limited to, those described in U.S. patent application Ser. No. 11/904,791 of Mattsson, filed Sep. 27, 2007, the contents of which are hereby incorporated by reference herein.

In some embodiments, the first encryption paradigm only allows the system (and users of the system) to encrypt data. Data encrypted on the system, either before or after the first encryption paradigm is implemented, preferably may not be accessed. In this embodiment, a public key (asymmetric) architecture can be used encrypt sensitive data, for example, credit card numbers, social security numbers, medical information, and personal records. Once encrypted with the public encryption key, the data may not be unencrypted without the private encryption key, which resides on the security device or in some other location in a secure location, preferably not on the system. In other embodiments, the system creates, for example, a random symmetric encryption key for encryption and decryption. This symmetric key is encrypted with the public key or is stored in an encrypted and/or password protected file for transport to the security device.

Suitable public-key (asymmetric) algorithms include, for example, RSA, the knapsack algorithm, discrete logarithm algorithms, elliptic curve cryptography (ECC) algorithms, and the like. Such algorithms are described generally in Andrew S. Tanenbaum, *Computer Networks* 752-55 (4th ed. 2003) and Bruce Schneier, *Applied Cryptography* (2d ed. 1996), the contents of which are incorporated by reference.

In other embodiments, the processing resources required for a public-key algorithms may deemed too costly, and other encryption techniques may be implemented in the first encryption paradigm. Symmetric-key algorithms such DES (Data Encryption Standard), Rijndael, 3DES (Triple DES), AES (Advanced Encryption Standard), and ANSI X9.24 may be employed to improve encryption performance. Such algorithms may be employed in a variety of cipher modes including, for example, electronic code book mode (ECB), cipher block chaining mode, cipher feedback mode, and stream cipher mode, and counter mode. AES is described in Federal Information Processing Standards (FIPS) Publication 197, the contents of which is hereby incorporated herein by reference. Symmetric-key algorithms and counter modes are described in Andrew S. Tanenbaum, *Computer Networks* 737-50 (4th ed. 2003) and Bruce Schneier, *Applied Cryptography* (2d ed. 1996), the contents of which are incorporated herein by reference.

No matter which encryption algorithm is used, an encryption key is needed to encrypt data. It is desirable to provide a new encryption key when the first encryption paradigm is implemented. In some embodiments of the invention, the new encryption key is obtained by the system and stored prior to the loss of network connectivity (S218). The new encryption key may be scrambled or encrypted before storage for greater security. When the first encryption paradigm is implemented, the new encryption key may be descrambled or unencrypted. The new encryption key may be descrambled or unencrypted by the system without user involvement. Such a system may be preferable in an environment such as a supermarket so that each POS system will be capable of implementing the first encryption paradigm in order to receive credit card numbers without user authentication at each POS system. In another embodiment, two passwords and/or encryption keys are required to access the new encryption key. A first password is provided by the user and/or the system. The second password is provided by another source, for example, the security device, a help desk, or a security center. In some embodiments, the user may call a help desk via telephone to obtain the second password. (In some embodiments, additional encryption keys can be used as supplement or substitute for password(s).)

Upon the establishment or reestablishment of a network connection with the security device (S210), the system implements a second encryption paradigm (S212). A second encryption key is transmitted to the system from the security device. The second encryption is used to encrypt data received after the second encryption paradigm is implemented. In some embodiments, data previously encrypted during the first paradigm is transmitted to the security device or other destination. The previously encrypted data may be transmitted along with the encryption key or information about the encryption key used to encrypt the data so that the data may be unencrypted (S214). In further embodiments, the data is deleted from the system as or after the data is transmitted (S216).

In some embodiments, yet another encryption key is transmitted from the security device to the system (S218). This third encryption key is used by the system to encrypt data during the next period of non-connectivity. Accordingly, key compartmentalization is provided wherein any potential data breach resulting from the theft of the system is minimized to the data received during a period of non-connectivity.

Figure 3:
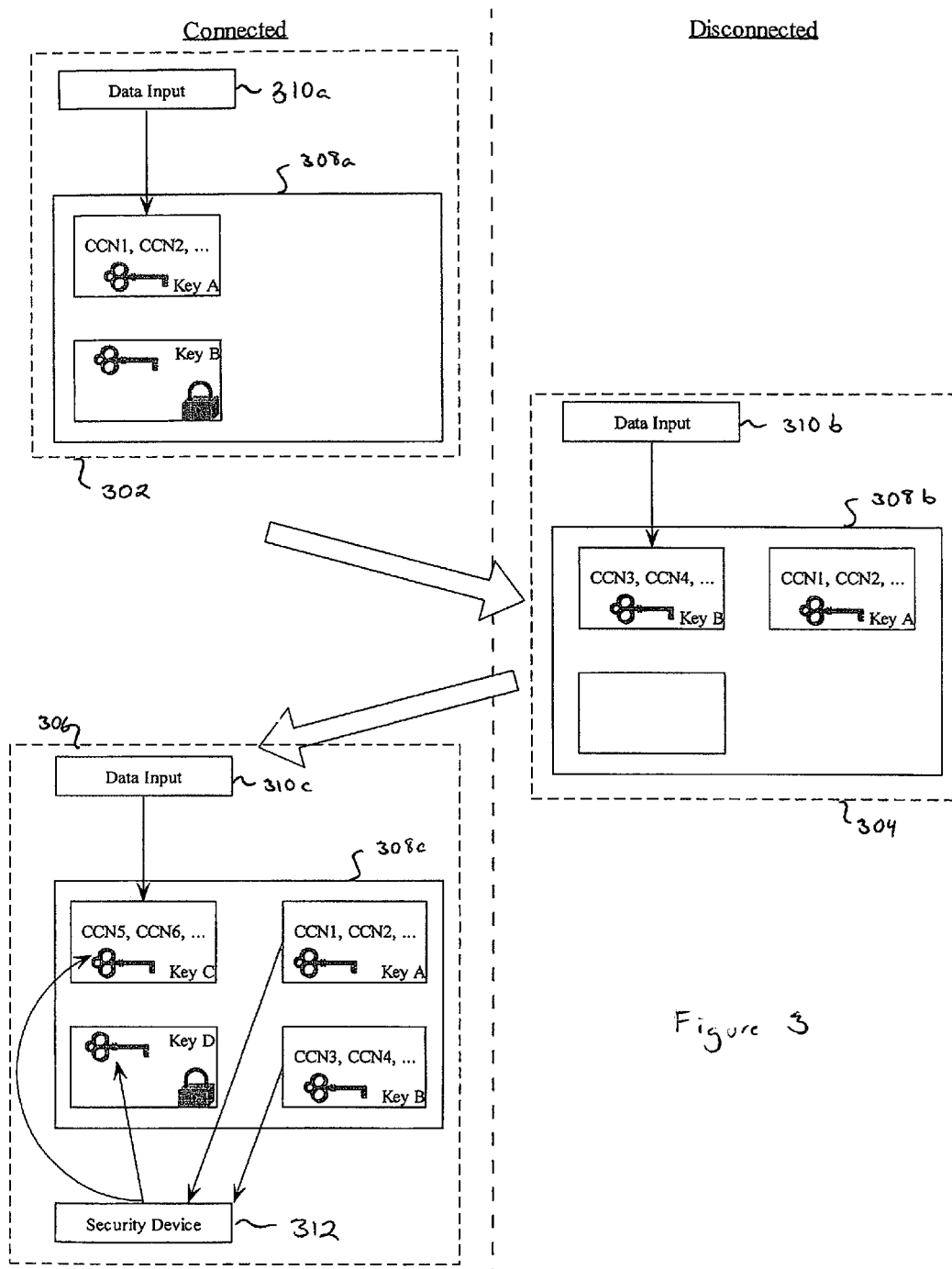
FIG. 3 illustrates how the inventions described herein implement new encryption paradigms as a system progresses from between a connected and a disconnected state.

FIG. 3 provides additional illustration of the concepts described herein. FIG. 3 provides three "snapshots" 302, 304, 306 of the system described herein as the system progresses from a connected state (302) to a disconnected state (304) and again to a connected state (306). Within each snapshot, a system 308a, 308b, 308c receives data from a data input 310a, 310b, 310c. Data input 310a, 310b, 310c can be any device, module, method, or process capable of generating data (e.g. a credit card reader).

In snapshot 302, system 308a is connected to a security device (not shown). As data is received (in this example, credit card numbers CCN1 and CCN2) the data is encrypted with encryption key A. This encrypted data may be continuously or periodically transferred to a centralized data center and/or deleted from system 308a as required and/or desired by operational and/or security needs. System 308a also has stored encryption key B for use when disconnected from the security device as described above. Access to encryption key B can be restricted, for example, through the use of one or more passwords or encryption techniques as described above.

In snapshot 304, system 308b is disconnected from a security device (not shown). Encryption key B is then retrieved and is used to encrypt new data CCN3 and CCN4. Previously encrypted data CCN1 and CCN2 remains on the system and encrypted with encryption key A.

In snapshot 306, system 308c is reconnected with security device 312. Security device 312 transmits a new encryption key C which is used for encryption of new data CCN5 and CCN6. Additionally, security device 312 transmits encryption key D which is stored for use when the system becomes disconnected in the future. Previously stored data CCN1, CCN2, CCN3, and CCN4 can be transmitted to security device 312 or some other data center for processing.

Note that while stored data in snapshots 302, 304, and 306 is depicted in separated boxes, such depiction is primarily for the purpose of illustrating the concept of implementing a different encryption paradigm whenever the system changes its connectivity state. For example, all of the stored data can be stored in the same database and/or the same database table. Even though data may be stored in the same location, key compartmentalization is achieved because the data is encrypted with different encryption keys.

Additionally, encryption keys may be changed in response to events other than a change in connectivity status. As described herein, an encryption key may be changed after the key is used to encrypt a defined volume of data or after the key is used for a defined time. For example, in some embodiments, the encryption is retired after encryption 10,000 data records and/or after 6 hours of use.

Differential Encryption Based on System Status as "Attended" vs. "Unattended"

In some embodiments, a different encryption paradigm is implemented depending on whether a system is attended or unattended.

As used herein, the concept of an "attended" vs. "unattended" system is flexible to reflect the varying security needs of business environments. For example, in some environments, an unattended system is defined as systems wherein an authorized user is not present, e.g. a self-checkout POS system, while an attended system is defined as a system wherein an authorized user is present, e.g. a POS system operated by a cashier. In other environments, the concept of "attended" may be defined to mean a system in which a user with a defined authority is present. For example, in some environments, only a manager or a technician may be authorized to access credit card numbers stored on a POS system.

Authentication can be accomplished by examining one or more credentials from the following categories: some property of the user/system is (e.g. fingerprint or retinal pattern, DNA sequence, signature recognition, other biometric identifiers, or Media Access Control (MAC) address), some object the user/system possesses (e.g. ID card, smart card, chip card, security token, or software token), and some knowledge possessed by the user/system knows (e.g. password, pass phrase, or personal identification number (PIN)). Authorization is a process of determining whether the authenticated user/client is allowed to view information or perform actions. The concepts of authentication and authorization are well known to those skilled in the art and, thus, not further described herein.

Figure 4:
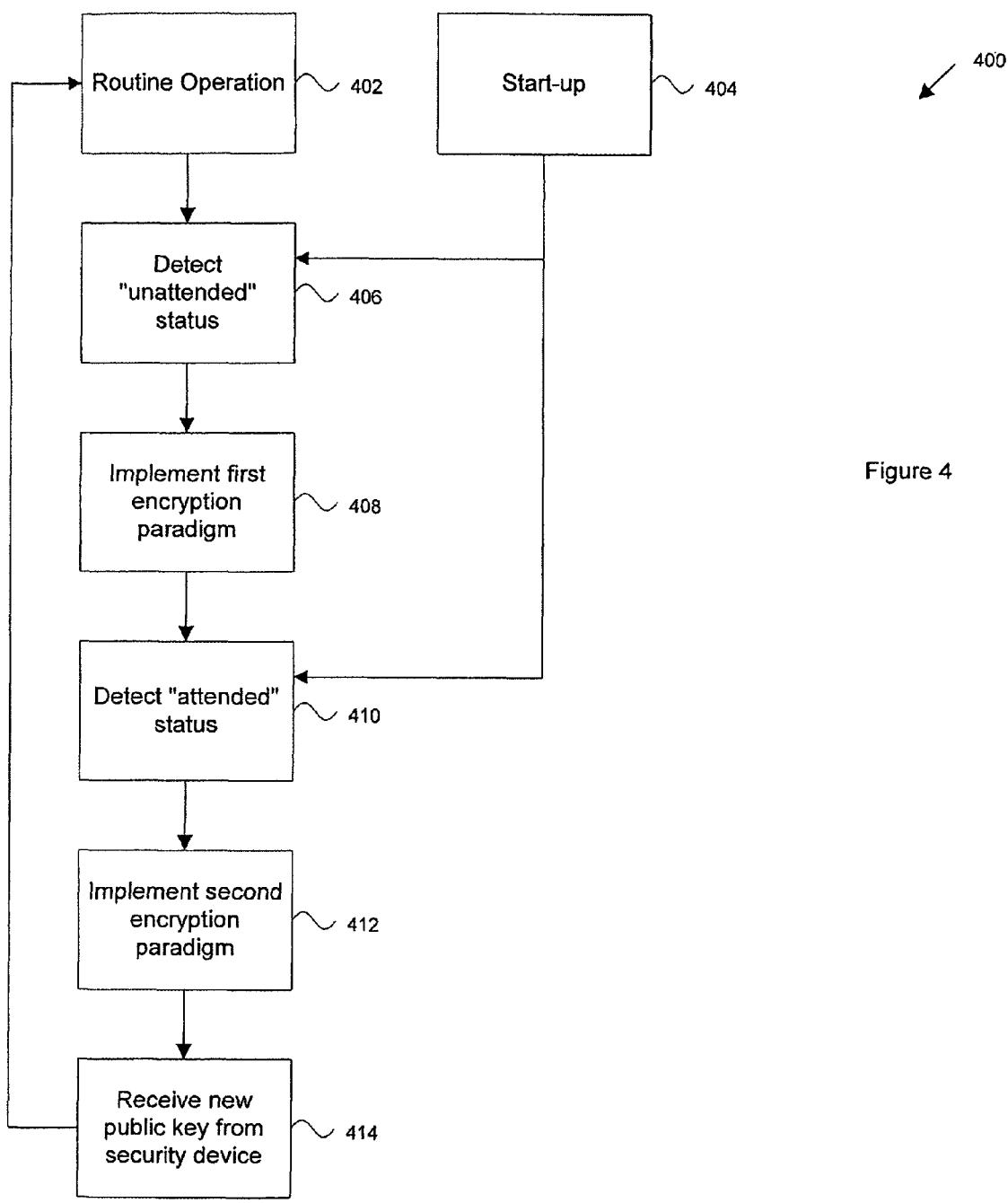
FIG. 4 is a flow chart depicting an embodiment of the invention for implementing a new encryption paradigm based on whether a system is attended or unattended.

As depicted in FIG. 4, some embodiments of the invention are directed to a method comprising the steps of: detecting that a system is unattended (S406), implementing a first encryption paradigm for the system (S408), detecting that the system is attended (S410), and implementing a second encryption paradigm for the system (S412).

The system's status as attended or unattended may be ascertained in a variety of ways (S406). In one embodiment, the system a default setting of "attended" or "unattended" is set. This setting may be overridden, when required, by authorized persons. Such an embodiment is advantageous in environments, such as a retail setting, because the embodiment allows for each POS system to be set as unattended by default. Therefore, if all of the POS systems are turned on at the same time (e.g. at opening of the store or after a power outage), each POS system will be able to receive and encrypt data without authentication.

In another embodiment, the system may be configured to detect the presence of a user. The absence of a user may be detected, for example, through the use of time outs, wherein the system detects a period of inactivity, or though other technologies such as a camera or other device to detect the presence of a user at the system. Other suitable technology includes, for example, the use of sensor to detect the weight of a human in a chair or the floor at the system. In some embodiments, the a prompt may be presented to the user allowing the user to verify his/her presence at the system before a "time out" causes the first encryption paradigm to be implemented.

The first encryption paradigm for an unattended system may include any or all of the features of the first encryption paradigm for the disconnected system as described with regard to FIGS. 2 and 3 above. In particular, it may be advantageous to allow only for the encryption of sensitive information when the system is unattended, i.e., to prohibit the unencryption of sensitive data when the system is unattended. Such a paradigm can be implemented through the use of public-key encryption as described herein.

The system's status as "attended," may in some embodiments be ascertained by the user authentication of himself or herself. Authentication may occur by any of the methods described herein, for example, by entry of a password. Once authenticated, the second encryption paradigm is implemented on the system. A second (durable) encryption key is used for newly encrypted data.

Improved data security is achieved by implementing a new encryption paradigm whenever the system's status changes between "attended" and "unattended." In particular, increased key compartmentalization results from the frequent change of encryption keys. Such compartmentalization minimizes the data breach caused if a single key becomes compromised. Moreover, key compartmentalization limits the volume of data that can be used for a statistical attack on a particular encryption key and multiplies the time required for a brute force attack to decrypt all data stored on the system.

Relationship between Connected/Disconnected and Attended/Unattended Status

Figure 5:
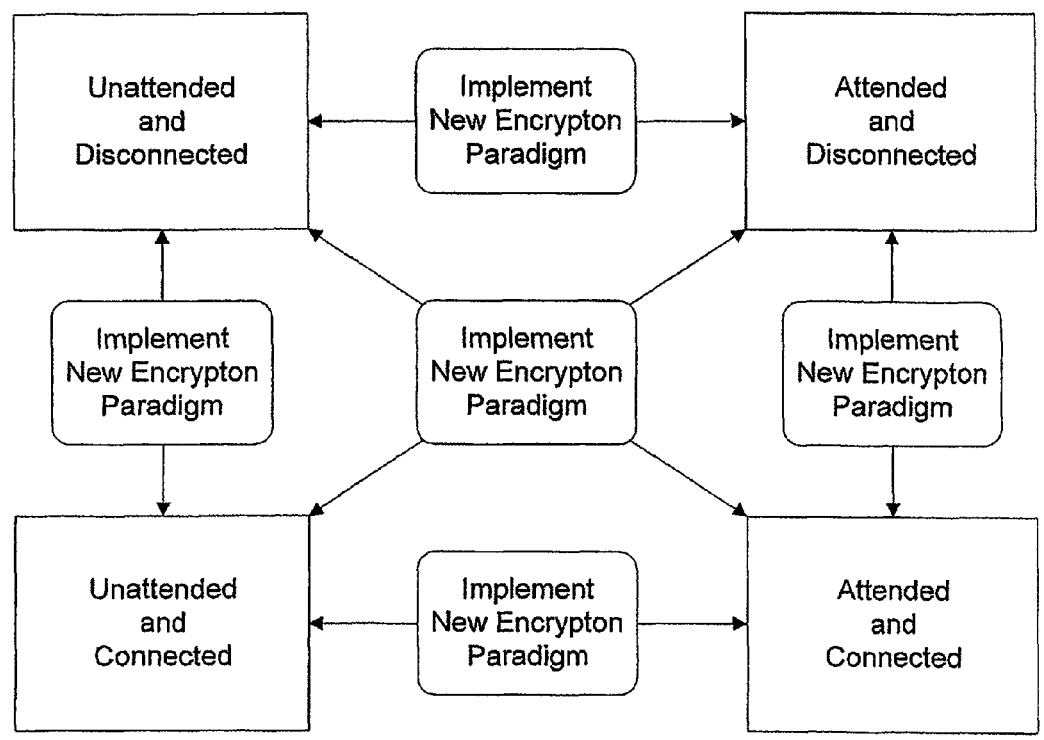
FIG. 5 illustrates that a new encryption paradigm may be implemented whenever a change in connectivity or attended/unattended status occurs

As depicted in FIG. 5, the above methods may be combined such that a new encryption paradigm is implemented whenever the system changes from "connected" to "disconnected" or "attended" to "unattended."

Distributed Differential Encryption

In some embodiments, the system described above may not serve an end user, but rather may be positioned between the security device and POS systems 114. Such a system would act as an intermediary between POS systems 114 and the security device. The system would control the encryption of each POS system in accordance with embodiments of the invention such as those described herein or the like.

Trust Modes

The utility of systems and methods for implementing differential encryption paradigms is enhanced when combined with the concept of trust modes. A trust mode defines the access to data granted to a system and/or user. The amount of access can be defined temporally and/or quantitatively.

Figure 6:
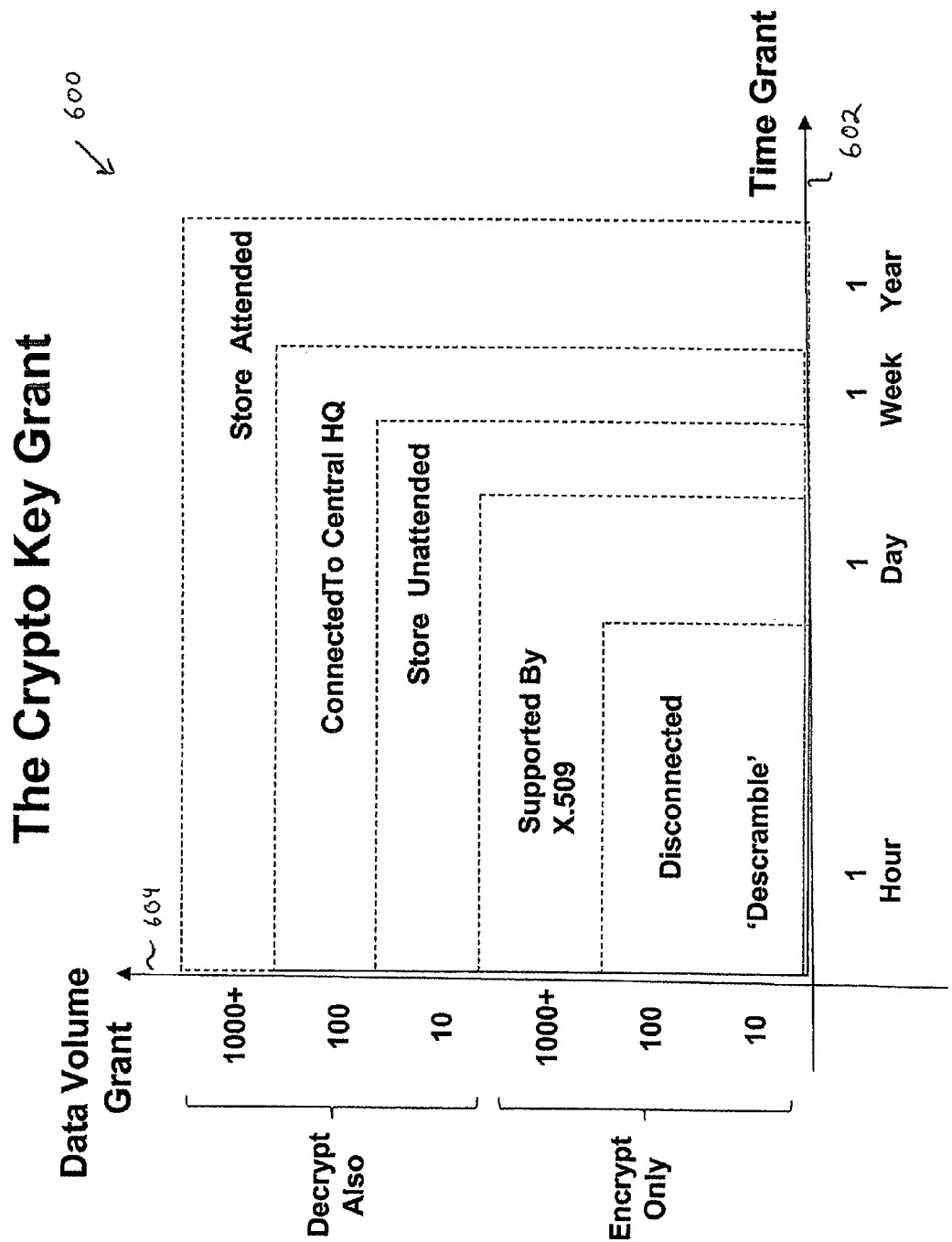
FIGS. 6, 6A, and 6B illustrate exemplary embodiments of trust modes.

For example, FIG. 6 provides a schematic 600 depicting trusts modes for implementation with the methods described above. The x axis 602 represents the temporal limitation for the trust mode and the y axis 604 depicts the data volume limitation for the trust mode. A number of trust modes 606, 608, 610, 612, 614 are defined which allow a system or user to encrypt and or decrypt a certain volume of data within a defined time period.

Figure 6A:
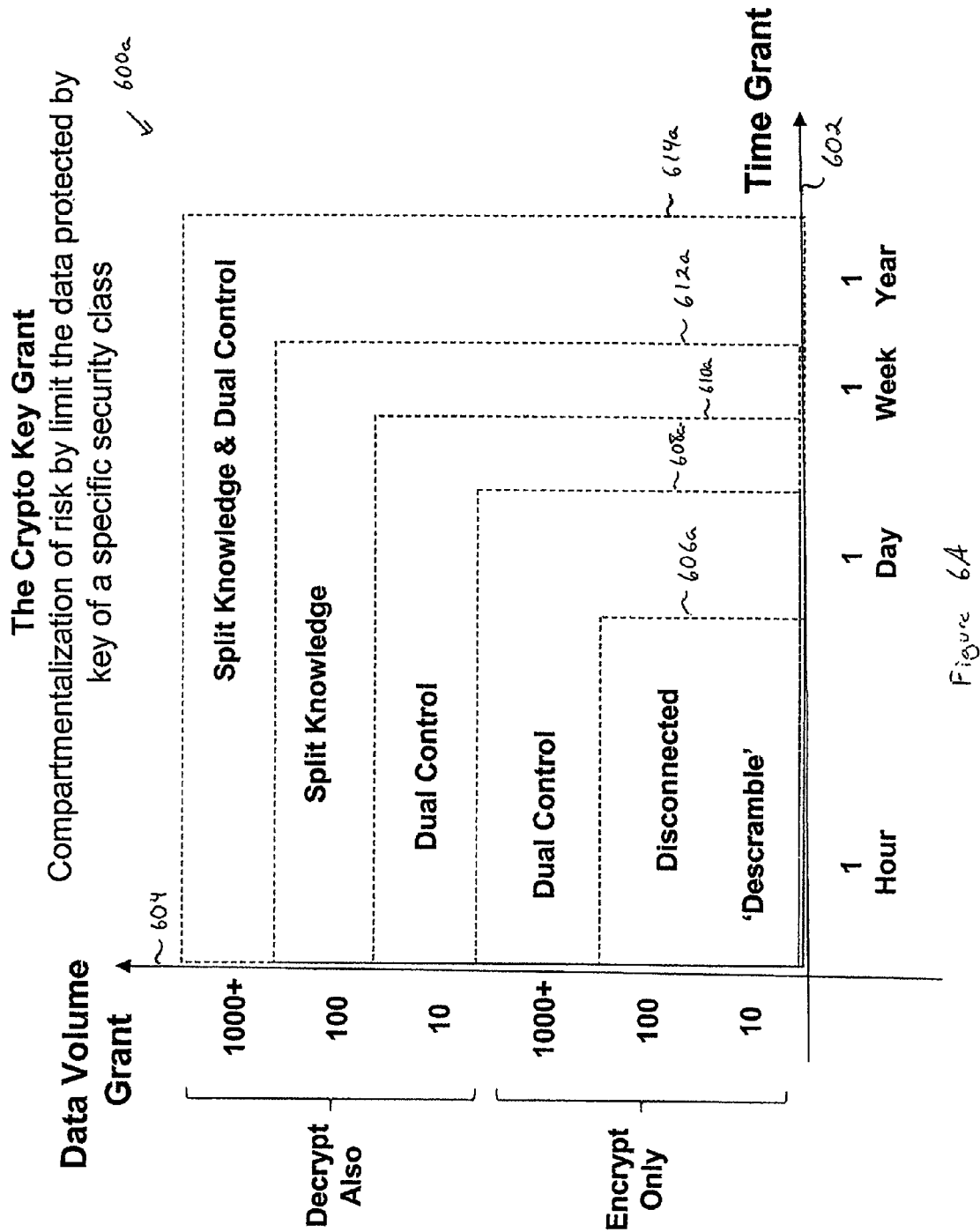

Schematic 600a in FIG. 6A depicts a paradigm with additional limitations for each trust mode 606a, 608a, 610a, 612a, 614a. Trust mode 606a is implemented when the system is disconnected from the security device. As described above, the system is only allowed to encrypt data. Additionally, the amount of data that may be encrypted is limited by volume and time. This minimizes any damage that would be caused if an untrustworthy employee disconnected a system, collected sensitive information, and then absconded with the system in an attempt to perform a brute force attack on the encrypted data.

Trust mode 608a allows for encryption of additional data, but requires dual control. Under one implementation of dual control, the system will refuse to accept and/or allow access to additional data beyond the threshold defined by trust mode 606a without authentication by two individuals, e.g. cashier/manager, manager/operations center personnel, etc. Trust mode 610a also contains a dual control limitation for decryption of data.

Trust mode 612a requires split knowledge (also known as "shared secrets"), wherein two individuals must provide information for decryption. For example, one individual may provide a first half of the encryption key, while the other individual provides the second half. Trust mode 614a implements both split knowledge and dual control.

The inventions herein may implement one or more trust modes in any sequence that is desirable in response to a series of events. For example, a system operating under a higher trust mode may implement a lower trust mode (and/or an associated encryption paradigm) upon the loss of connectivity with the security device.

The inventions herein may also implement one or more trust modes (e.g. at startup) based on one or more validation checks of components including, but not limited to: an application, the system, a session, a database, the security device, credential (e.g. logon credentials). Additionally or alternatively, a particular trust mode may be implemented because a system, user, and/or application has a history of data access limit violations or other security violations.

Figure 6B:
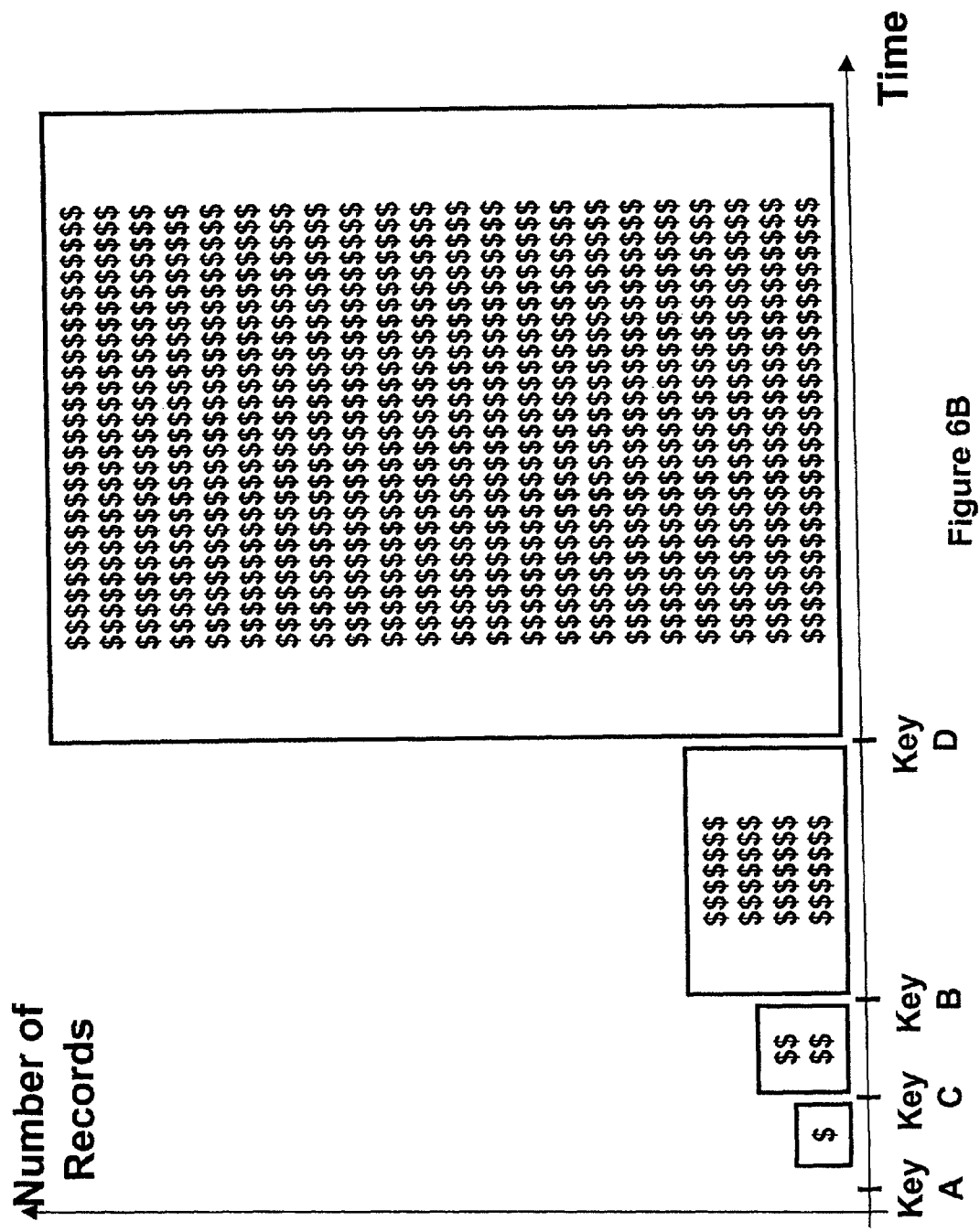

As illustrated in FIG. 6B, various encryption keys can be used to encrypt various volumes of data. The strength of encryption may vary to reflect to the volume of data stored with the encryption key. For example, a longer encryption key and/or a stronger encryption algorithm can be used when larger volumes of data are encrypted.

Additionally, access to encryption keys used for higher volumes of data can be regulated in the context of trust modes as illustrated in FIGS. 6 and 6A. For example, a disconnected system can be granted access only to encryption keys used to encrypt smaller amounts of data, while attended and connected systems can be granted access to encryption keys used to encrypt larger volumes of data.

Moreover, the inventions described herein may limit the volume of data that may be encrypted with each encryption key used within a trust mode. Additionally or alternatively, the inventions described herein may limit the time that each encryption key used within a trust mode is viable for encryption. For example, in a lower trust mode, each encryption key may be limited to encrypting lower volumes or data and/or may only be used to encrypt data for a relatively short time. Such a trust mode will result in a highly compartmentalized encryption scheme, wherein a would-be thief must break several encryption keys in order to access all of the data stored on a system. Moreover, the high costs of a brute force attack will yield little data as a relatively low volume of data is encrypted with each encryption key.

Implementation of Data Access Limits

In some embodiments, the system can be authorized to perform a specified number (e.g., 1,000, 10,000, 100,000) of encryption transactions without communicating with the security device. In some embodiments, the system may contain an indicator value that reflects the number of requests that the system can make before the system must communicate with the security device. The indicator value can be increased in some embodiments, or can be decreased in others to reflect operational and/or security needs. For example, the indicator value may initially be zero and may be increased towards the threshold of 1,000. Alternatively, the indicator value may be initially be 1,000 and decreased to a threshold of zero.

The indicator value may be modified by one or another value for each request for information. Alternatively, the indicator value may be modified for each record returned by the request. For example, if a query to a database returned five social security numbers, the indicator value could be increased or decreased by five.

As the embodiment is designed, the system preferably requires periodic communications with the security device if a user is to enjoy uninterrupted access to sensitive data. Accordingly, the system preferably is configured to contact the security device whenever a network connection exists, at a defined interval, when the indicator value is within a defined distance from the threshold, and/or when the indicator value exceeds the threshold. The security device can communicate with the system to modify the indicator value and/or the threshold value.

Dynamic Trust Modes

Trust modes may be further refined to limit or prohibit access to marked data. The rules limiting access could be similar to the rules described above, but would apply in whole or in part to marked data, as opposed to all data in the system. Marked data could include any item including, but not limited to, files, images, sound recording and videos. Marked data can be identified in many ways as is known to one of ordinary skill in the art. Examples of such means of identification include, but are not limited to: inclusion of a flag in file attributes; naming conventions; and the creation of a list or database listing marked items. Certain marked data (e.g., security log files) may be so sensitive such that any attempts to access the file should automatically trigger intrusion detection. Such intrusion detection can include a variety of components that will vary based on a particular implementation of the invention and procedures of the organization using an embodiment of the invention.

Examples of intrusion detection procedures include, but are not limited to, writing a log, modifying one or more trust modes to place restrictions or prohibitions on access to one or more resources for defined period of time or until an administrator restores access; alerting one or more administrators of a potential intrusion, altering one or more intrusion detection profiles and/or trust modes, altering a security level, shutting down one or more data at rest systems (e.g. databases, file systems, network attached storage (NAS) devices, storage area network (SAN) devices), commencing analysis of historical data access records and commencing inference analysis.

Analysis of historical data access records may employ, for example, methods and/or systems for the compilation of access records, computations of statistics based on the records, and/or presentation of the records and statistics. The presentation of the records and statistics may include textual, pictorial and/or graphical elements.

Inference analysis may include, for example, the use of data mining and machine learning technologies and techniques such as Bayes' theorem and the like. For example, anti-spam filters are becoming increasingly sophisticated, with accuracy rates in the high 90 percent being the norm. The best solutions combine Bayesian filtering and content inspection. Most use some combination of Bayesian filtering and content analysis along with whitelists and blacklists. The content filtering will inspect the accessed data element over time and the relation to sensitive data element. As a general rule, accuracy improves when inspection is moved farther away from the desktop and closer to the server.

Bayes' theorem is a facet of probability theory that relates the conditional and marginal probability distributions of random variables. The goal of the inference analysis is to detect patterns and develop heuristics or algorithms that predict intrusions. In machine learning implementations, such as spam filtering or detecting intrusions, Bayes' theorem is instructive on how to update or revise beliefs, a posteriori, in light of new evidence.

The goal of inference is typically to find the distribution of a subset of the variables, conditional upon some other subset of variables with known values (the evidence), with any remaining variables integrated out. This is known as the posterior distribution of the subset of the variables given the evidence. The posterior distribution gives a universal sufficient statistic for detection applications, when one wants to choose values for the variable subset which minimize some expected loss function, for instance the probability of decision error. A Bayesian network thus can be considered a mechanism for automatically constructing extensions of Bayes' theorem to more complex problems. The most common exact inference methods are: variable elimination which eliminates (by integration or summation) the non-observed non-query variables one by one by distributing the sum over the product; clique tree propagation which caches the computation so that the many variables can be queried at one time and new evidence can be propagated quickly; and recursive conditioning, which allows for a space-time tradeoff but still allowing for the efficiency of variable elimination when enough space is used. All of these methods have complexity that is exponential with respect to tree width. The most common approximate inference algorithms are stochastic MCMC simulation, mini-bucket elimination which generalizes loopy belief propagation, and variational methods.

In order to fully specify the Bayesian network and, thus, fully represent the joint probability distribution, it is necessary to further specify for each node X the probability distribution for X conditional upon X's parents. The distribution of X conditional upon its parents may have any form. It is common to work with discrete or Gaussian distributions since that simplifies calculations. Sometimes only constraints on a distribution are known; one can then use the principle of maximum entropy to determine a single distribution, the one with the greatest entropy given the constraints. (Analogously, in the specific context of a dynamic Bayesian network, one commonly specifies the conditional distribution for the hidden state's temporal evolution to maximize the entropy rate of the implied stochastic process.)

Often these conditional distributions include parameters which are unknown and must be estimated from data, sometimes using the maximum likelihood approach. Direct maximization of the likelihood (or of the posterior probability) is often complex when there are unobserved variables. A classical approach to this problem is the expectation-maximization algorithm which alternates computing expected values of the unobserved variables conditional on observed data, with maximizing the complete likelihood (or posterior) assuming that previously computed expected values are correct. A more fully Bayesian approach to parameters is to treat parameters as additional unobserved variables and to compute a full posterior distribution over all nodes conditional upon observed data, then to integrate out the parameters. This approach can be expensive and lead to large dimension models so, in practice, classical parameter-setting approaches are more common.

Embodiments of the invention implementing Bayesian inferences typically begin with predefined rules and/or beliefs regarding user behaviors. Information is gathered from data requests. As discussed herein, these requests are evaluated against said rules and beliefs. If a request violates a rule or conforms to a belief that the request constitutes an intrusion, the request is denied. Beliefs may be expressed probabilistically, i.e., instead of predicting whether or not a request constitutes an intrusion, embodiments of the invention herein preferably produce probabilities that a request constitutes an intrusion. These probabilities can be blended with other probabilities produced through other statistical methods as is well known to those of ordinary skill in the art. See, e.g., U.S. Pat. No. 7,051,077 to Lin, the contents of which are incorporated herein by reference.

Embodiments of the invention utilize outside knowledge to revise beliefs and rules. For example, if a manager requests credit card numbers from a retail store with which she is not affiliated, embodiments of the invention herein can deny access to the data. The manager may, in turn, contact a helpdesk or other system administrator to justify her need for the files. Assuming that the need is legitimate, the helpdesk or administrator can modify classification of the request as not an intrusion. The system, in turn, may be less likely to classify similar requests by similar users as an intrusion in the future.

In embodiments of the invention configured to prevent intrusion in a file system, the item access rule can limit the number of read and/or write requests that may be processed by a user and/or a group of users in one or more files, one or more directories, one or more servers and/or the entire file system. Additionally, item access rules can limit the number of files and/or volume of data that may be accessed by a user or group of users in one or more files, one or more directories, one or more servers and/or the entire file system. Embodiments of the invention described herein may be implemented for a variety of file systems including but not limited to those described herein.

In some embodiments of the invention, inference patterns and analysis as described herein are included in intrusion detection policies. A violation of a inference pattern can result in the security device restricting access to the data at rest system that the requestor is attempting to access and can also restrict access to additional systems including, but not limited to, file system(s), database(s), application(s) and network(s). As described herein, the inference patterns and analysis can include Bayesian inference.

Various embodiments of the invention can produce a scorecard. The scorecard may contain information gathered by sensors and the security devices as well as information from log files including, but not limited to, violation attempts, session statistics and data access statistics. The scorecard may be presented in many formats including, but not limited to, textual, pictorial, graphical and in electronic format, such as a webpage. The scorecard may show data access statistics with respect to an entity including, but not limited to, a user, an application, a database, a query and a column. The scorecard may also include a metric to represent the severity of a threat. In computing the metric, item requests may be given varying weights depending on the sensitivity of the data. An exemplary dynamic intrusion detection system is described in U.S. Patent Application No. 2007/0083928 to Mattsson, et al., the contents of which are incorporated by reference herein.

Figure 7:
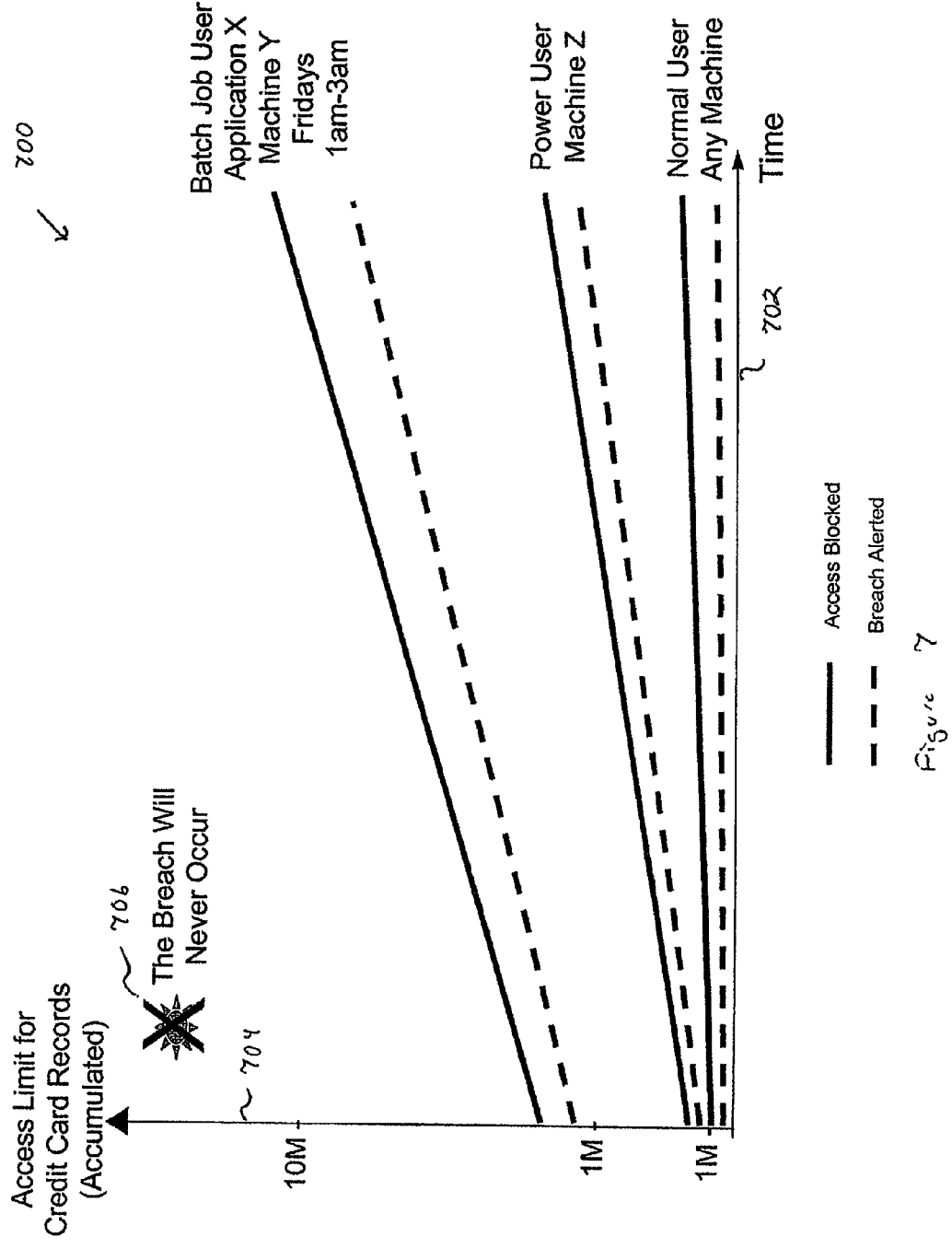
FIG. 7 illustrates how the invention described herein prevents data breaches.

FIG. 7 provides a graph 700 illustrating some of the principles preferably embodied in the invention. The graph 700 shows the amount of data (the y axis 704) accessed by three users over time (the x axis 702). Dashed lines indicate thresholds for each user at which an alert is triggered. Solid lines indicate threshold for each user at which access is blocked. Icon 706 depicts a data breach that will be prevented irrespective of which user seeks to acquire the data. As is seen, different users may access data at different rates. These rates may be set (e.g. as a function of the user's position) or may be learned by the security device.

Exemplary Implementation

Figure 8:
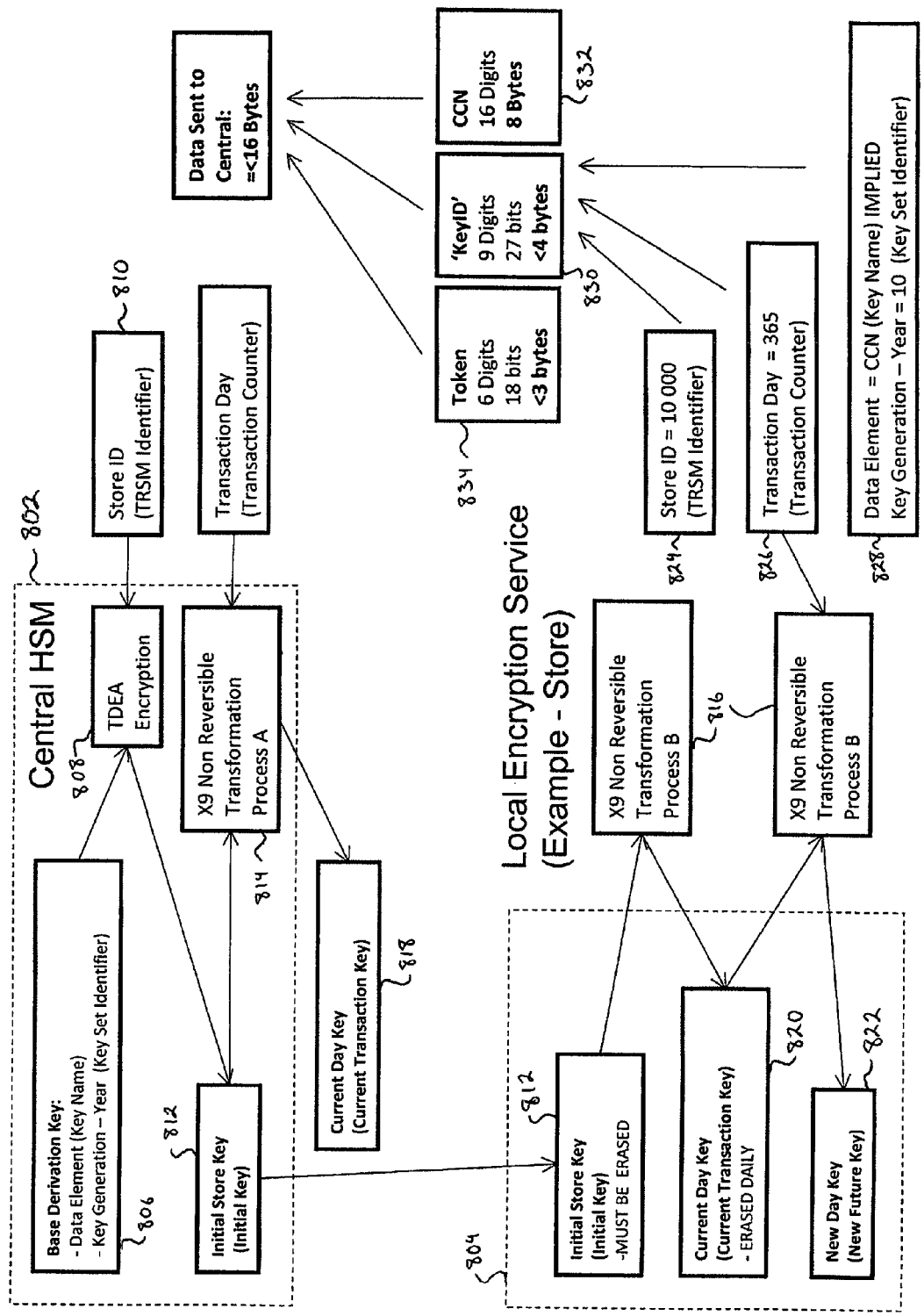
FIG. 8 illustrates an exemplary implementation of the inventions described herein.

The following exemplary implementation, illustrated in FIG. 8, is provided to illustrate the concepts described herein. A central HSM 802 is provided, for example, as part of a security device and/or company headquarters, along with a local encryption service 804, for example, part of the system described herein.

In step 806, the central HSM 802 produces a base derivation key that can be used to produce all or a portion of the encryption keys used through the HSM 802 and in the local encryption services 804. The base derivation key is computed from a data element key and non-secret information.

The data element key is a previously produced encryption key. Ideally, the data element key is stored in an HSM with physical security features. For example, the data element key may be stored in an HSM conforming to FIPS Security Level 2 or 3. An HSM conforming to FIPS Security Level 2 is required to have evidence of tampering (e.g., a cover, enclosure or seal on the physical aspects of the engine 124) as well as an opaque tamper-evidence coating on the engine's 124 encryption chip. An HSM conforming to FIPS Security Level 3 is required to perform automatic zeroization (i.e. erasure of sensitive information such as encryption keys) when a maintenance access interface is accessed, as well as a removal-resistant and penetration-resistant enclosure for the encryption chip.

The date element key preferably resides only in the HSM or in other secure devices in the headquarters and is preferably not distributed to the local encryption services. The data element key is preferably a double-length (128 bit) or triple-length (192 bit) encryption key.

The data element key is combined with key generation information to produce the base derivation key. The key generation information can be obtained from a variety of sources, for example, a random number generator. The key generation information can also be obtained from time and date information, for example, the current year.

The key generation information and the data element key may combined according to any method known to those of skill in the art, including, but not limited to, concatenation, hashing, arithmetic operations (e.g. addition, subtraction, multiplication, division, module, AND, OR, and XOR), and encryption.

In step 808, the base derivation key is combined with a store ID 810 to produce an initial store key 812. The base derivation key and store ID 810 may combined according to any method known to those of skill in the art, including, but not limited to, concatenation, hashing, arithmetic operations (e.g. addition, subtraction, multiplication, division, module, AND, OR, and XOR), and encryption (e.g. the Triple Date Encryption Algorithm (TDEA)).

The initial store key 812 is transferred to the local encryption service 804. On both the central HSM 802 and the local encryption service 804, non-reversible transformation processes A (814) and B (816) produce the current day key 818, 820 from the initial store key 812. After the current day key 820 is computed from the initial store key, the initial store key is deleted from the local encryption service 804.

Transformation processes may consist of or incorporate time-stamping algorithms such as RFC 3161 or ANSI ASC X9.95. See, e.g. ANSI, *ANSI X9.24-1:2004: Retail Financial Services Symmetric Key Management Part* 1: *Using Symmetric Techniques* (2004); ANSI, *ANSI X9.24-2:2006 Retail Financial Services Symmetric Key Management Part 2: Using Asymmetric Techniques for Distribution of Symmetric Keys* (2004); C. Adams et al., Internet X.509 Public Key Infrastructure Time-Stamp Protocol (TSP) (2001), available at http://tools.ietf.org/html/rfc3161.

In the local encryption service, a new day key 822 is produced by a non-reversible transformation process B 816 which accepts as its inputs the current daily key and encryption date. After the new day key 822 is created, the current day key 820 is deleted.

Transformation processes A (814) and B (816) are related as the must produce the same output on any give day so that the central HSM 802 may decrypt the data encrypted on the local encryption service. However, the processes 814 and 816 are different as each function accepts different inputs. The relationship between the processes can thus be expressed functionally as follows:

$$F_A(\text{Initial Store Key, Encryption Day}) = F_B(\text{Current Daily Key, Encryption Day}).$$

The invention is not limited to the embodiments described herein. In other embodiments, the new day key 822 is produced on the POS system, in a server located in each store, or in the headquarters. A secure key store as described herein is, in some embodiments, located in the same location that the new day is produced.

Store ID 824, and encryption day 826, and data element 828 are combined to form a Key ID 830 that contains the information required by the central HSM 802 to decrypt the encrypted data 832 (in this example, a CCN). Optionally, a token 834 can be used to encrypt data 832 and this token 834 can be sent to the central HSM 802 along with the data 832 and the Key ID 830.

In some embodiments, the encrypted data 832 is encrypted so that the encrypted data 832 contains information about the type of data that is encrypted. For example, the encrypted data 832 can contain information to identify that the encrypted data should be encrypted as a credit card number (as opposed to a string, an integer, or a binary). In an exemplary embodiment, the encrypted data 832 is encrypted in accordance with U.S. patent application Ser. No. 09/721,942 of Mattsson et al. and/or U.S. patent application Ser. No. 11/904,791 of Mattsson. The contents of both applications are hereby incorporated by reference herein.

The functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., modules, databases, computers, clients, servers and the like) shown as distinct for purposes of illustration can be incorporated within other functional elements, separated in different hardware or distributed in a particular implementation.

The invention has been described in detail including preferred embodiments. However, one skilled in the art may make modifications or improvements within the spirit and scope of the invention.

What is claimed is:

1. A method of data security comprising:
    determining the status of a connection between a first system and a security system;
    responsive to a determination that the first system is disconnected from the security system:
        implementing a first encryption paradigm at the first system, the first encryption paradigm comprising a temporary encryption key;
        encrypting data received at the first system while the first system is disconnected from the security system with the temporary encryption key; and
        storing the encrypted data at the first system; and
    responsive to a determination that the first system is connected to the security system:
        implementing a second encryption paradigm at the first system,
    the second encryption paradigm comprising transmitting the stored encrypted data to the security system, and receiving from the security system a durable encryption key to replace the temporary encryption key and a new temporary encryption key.

2. The method of claim 1, wherein the first system is one selected from the group consisting of: a client, a server, a personal computer, a handheld device, a personal digital assistant, a cellular phone, a kiosk, an automatic teller machine, a point of sale system, and a vending machine.

3. The method of claim 1, wherein the first encryption paradigm further comprises temporary credentials for use by the first system while the first paradigm is implemented.

4. The method of claim 3, wherein the step of implementing the second encryption paradigm comprises:
    transmitting the temporary credentials from the first system to the security system; and
    replacing the temporary credentials with credentials configured to allow the security system to access the first system.

5. The method of claim 1, wherein the step of implementing the first encryption paradigm comprises:
    encrypting the temporary encryption key.

6. The method of claim 1, wherein the step of implementing the first encryption paradigm comprises:
    obtaining the new temporary encryption key previously sent by the security system to the first system.

7. The method of claim 1, wherein information about the temporary encryption key is transferred to the security system with the encrypted data.

8. The method of claim 1, wherein the step of implementing the second encryption paradigm comprises:
    encrypting data received while the first system is connected to the security system with the durable encryption key; and
    transmitting the encrypted data from the first system to the security system.

9. The method of claim 1, wherein the first encryption paradigm includes a first limit on data access by a user of the first system.

10. The method of claim 9, wherein the second encryption paradigm includes a second limit on data access by a user of the first system, and wherein the second limit allows for more data access than the first limit.

11. The method of claim 1, wherein the temporary encryption key of the first encryption paradigm is transmitted from the security system to the first system while the first system is connected to the security system.

12. The method of claim 11, further comprising:
subsequent to receiving the new temporary encryption key, determining the status of a connection between the first system and the security system; and
responsive to a determination that the first system is disconnected from the security system, implementing a third encryption paradigm at the first system, the third encryption paradigm comprises the new temporary encryption key.

13. A method of data security comprising:
determining whether a first system is attended by a user with a pre-defined authority to access the first system;
responsive to a determination that the first system is not attended by the user with the pre-defined authority:
implementing a first encryption paradigm at the first system, the first encryption paradigm comprising a temporary encryption key;
encrypting data received at the first system while the first system is not attended by the user with the pre-defined authority with the temporary encryption key; and
storing the encrypted data at the first system; and
responsive to a determination that the first system is attended by the user with the pre-defined authority:
implementing a second encryption paradigm at the first system,
the second encryption paradigm comprising transmitting the stored encrypted data to the security system, and receiving from the security system a durable encryption key to replace the temporary encryption key and a new temporary encryption key.

14. The method of claim 13, wherein the step of implementing the first encryption paradigm comprises temporary credentials for use by the first system while the first encryption paradigm is implemented.

15. The method of claim 13, wherein the step of implementing the first encryption paradigm comprises:
encrypting the temporary encryption key.

16. The method of claim 13, wherein the step of implementing the first encryption paradigm comprises:
obtaining the new temporary encryption key previously sent by the security system to the first system.

17. The method of claim 13, wherein information about the temporary encryption key is transferred to the security system with the encrypted data.

18. The method of claim 13, wherein the step of implementing the second encryption paradigm comprises:
encrypting data received while the first system is attended by the user with the pre-defined authority; and
transmitting the encrypted data from the first system to the security system.

19. The method of claim 13, wherein the first encryption paradigm includes a first limit on data access by a user of the first system.

20. The method of claim 13, wherein the second encryption paradigm includes a second limit on data access by a user of the first system, and wherein the second limit allows for more data access than the first limit.

21. The method of claim 13, wherein the temporary encryption key of the first encryption paradigm is transmitted from the security system to the first system while the first system is attended by the user with the pre-defined authority.

22. The method of claim 21, further comprising:
subsequent to receiving the new temporary encryption key, determining whether the first system is attended by the user with the pre-defined authority; and
responsive to a determination that the first system is not attended by the user with the pre-defined authority, implementing a third encryption paradigm at the first system, the third encryption paradigm comprises the new temporary encryption key.

23. A non-transitory computer-readable medium storing computer executable instructions configured to cause a computer to perform a method of data security comprising:
determining the status of a connection between a first system and a security system;
responsive to a determination that the first system is disconnected from the security system:
implementing a first encryption paradigm at the first system, the first encryption paradigm comprising a temporary encryption key;
encrypting data received at the first system while the first system is disconnected from the security system with the temporary encryption key; and
storing the encrypted data at the first system; and
responsive to a determination that the first system is connected to the security system:
implementing a second encryption paradigm at the first system,
the second encryption paradigm comprising transmitting the stored encrypted data to the security system, and receiving from the security system a durable encryption key to replace the temporary encryption key and a new temporary encryption key.

24. A non-transitory computer-readable medium storing computer executable instructions configured to cause a computer to perform a method of data security comprising:
determining whether a first system is attended by a user with a pre-defined authority to access the first system;
responsive to a determination that the first system is not attended by the user with the pre-defined authority:
implementing a first encryption paradigm at the first system, the first encryption paradigm comprising a temporary encryption key;
encrypting data received at the first system while the first system is disconnected from the security system with the temporary encryption key; and
storing the encrypted data at the first system; and
responsive to a determination that the first system is attended by the user with the pre-defined authority:
implementing a second encryption paradigm at the first system,
the second encryption paradigm comprising transmitting the stored encrypted data to the security system, and receiving from the security system a durable encryption key to replace the temporary encryption key and a new temporary encryption key.

* * * * *